United States Patent

Ogawa

[11] Patent Number: 6,137,961
[45] Date of Patent: *Oct. 24, 2000

[54] CAMERA OR APPARATUS ADAPTED TO USE FILM CARTRIDGE OR DEVICE APPLICABLE TO SUCH CAMERA OR APPARATUS

[75] Inventor: Yukio Ogawa, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,453

[22] Filed: Feb. 4, 1997

Related U.S. Application Data

[63] Continuation of application No. 08/358,345, Dec. 19, 1994, abandoned.

[30] Foreign Application Priority Data

Dec. 28, 1993 [JP] Japan ................................. 5-336706

[51] Int. Cl.$^7$ ........................... G03B 17/18; G03B 17/02; G03B 17/26
[52] U.S. Cl. .......................... 396/283; 396/516; 396/538
[58] Field of Search ..................... 354/174, 288; 396/360, 366, 367, 516, 538, 281, 283

[56] References Cited

U.S. PATENT DOCUMENTS

| | | | |
|---|---|---|---|
| 4,697,903 | 10/1987 | Koda et al. | 354/288 |
| 5,122,823 | 6/1992 | Baxter et al. | 354/212 |
| 5,155,514 | 10/1992 | Tamamura | 354/174 |
| 5,159,365 | 10/1992 | Takahashi et al. | 354/21 |
| 5,323,201 | 6/1994 | Ruchiuso et al. | 354/288 |
| 5,394,213 | 2/1995 | Hazama et al. | 354/288 |
| 5,418,587 | 5/1995 | DiRisio | 354/174 |
| 5,430,515 | 7/1995 | Lawther et al. | 396/513 |
| 5,432,573 | 7/1995 | Lawther et al. | 354/174 |
| 5,612,760 | 3/1997 | Okuno | 396/513 |
| 5,930,537 | 7/1999 | Okuno et al. | 396/281 |

Primary Examiner—Russell Adams
Assistant Examiner—Christopher E. Mahoney
Attorney, Agent, or Firm—Robin, Blecker & Daley

[57] ABSTRACT

A camera or an apparatus adapted to use a film cartridge, or a unit applicable to the camera or the apparatus, includes a first member arranged to move the film cartridge at least for one of loading and unloading the film cartridge on or from the camera or the apparatus, and a second member arranged to prevent the first member from acting detrimentally at least on transportation of a film contained in the film cartridge.

28 Claims, 12 Drawing Sheets

CAMERA OR APPARATUS ADAPTED TO USE FILM CARTRIDGE OR DEVICE APPLICABLE TO SUCH CAMERA OR APPARATUS

This is a continuation application under 37 CFR 1.62 of prior application Ser. No. 08/358,345, filed Dec. 19, 1994 now abandoned.

BACKGROUND OF THE INVENTION

1. Field of the Invention

This invention relates to an apparatus such as a camera or the like adapted for use with a film cartridge and more particularly to a device for loading or unloading the film cartridge on or from the apparatus.

2. Description of the Related Art

A known film cartridge is called "a thrust type cartridge film" and arranged to have the leader part of a film completely stowed within the cartridge together with the film and to send out the leader part of the film by means of a film feeding fork of a camera. The camera can be easily loaded with the film cartridge of this type in a manner called "drop-in loading", as the film cartridge can be put into a film loading chamber of the camera from the axial direction of the cartridge.

A feature of this film cartridge lies in that the film stowed in the cartridge is provided with a magnetic recording part.

The conventional drop-in loading type camera which uses the film cartridge of this kind requires an operator to open the lid of a cartridge chamber of the camera by hand, to axially insert the film cartridge into the cartridge chamber deep enough to have it hit the bottom of the cartridge chamber and then to close the lid of the cartridge chamber by hand. The lid opening-and-closing operation on the cartridge chamber has been troublesome. Besides, if the lid of the cartridge chamber is closed before the film cartridge is correctly inserted deep enough, the cartridge would interfere with the lid of the cartridge chamber to prevent the latter to be smoothly closed and thus to necessitate the operator to do the inserting operation over again. The camera thus has had a drawback in its poor operability.

To eliminate this drawback, the applicant of the present application has proposed a camera arranged to carry out the cartridge loading operation by means of an electric motor. According to this, the film cartridge is pulled into the camera and moved out of the camera by pushing rollers against the shell of the film cartridge while the rollers are driven to rotate by the motor. This camera, however, has presented the following problem.

Generally the cartridge shell varies in size within the range of tolerance. To accept all cartridge shells of such different sizes, the cartridge chamber is arranged to be somewhat larger than a standard size. The cartridge shell and a film winding spool shaft which is disposed within the cartridge are also arranged to have some play between them to absorb the tolerances assigned to them.

Therefore, in transmitting the driving force of the film feeding fork disposed on the side of the camera to the spool shaft disposed within the cartridge with the fork allowed to engage the spool shaft, the arrangement to restrict the position of the cartridge shell by applying a pressing load of the rollers to the cartridge shell for loading the camera with results in the film cartridge, the film winding spool shaft within the cartridge not smoothly engaging the fork of the camera. The load on the fork then fluctuates to cause changes in the speed at which the fork sends out or rewinds the film. If information is read out or written into the magnetic recording part of the film under such a condition, not only would the information reading or writing result in some errors but also the load on a film feeding (thrust) driving action would become too heavy for a normal film feeding or transportation.

SUMMARY OF THE INVENTION

One aspect of this invention resides in the provision of a camera or an apparatus adapted for use with a film cartridge, or a device applicable to the camera or the apparatus, adapted to use a film cartridge and arranged according to this invention as an embodiment thereof to include first means for moving the film cartridge at least for one of loading and unloading a film cartridge with respect to the camera or the apparatus and second means arranged to prevent the first means from acting detrimentally on an action of transporting the film of the film cartridge, so that the film of the film cartridge can be adequately transported.

The above and other aspects and features of this invention will become apparent from the following detailed description of embodiments thereof taken in connection with the accompanying drawings.

DETAILED DESCRIPTION OF THE PREFERRED EMBODIMENTS

Some of preferred embodiments of this invention are described below with reference to the drawings.

Figure 1:
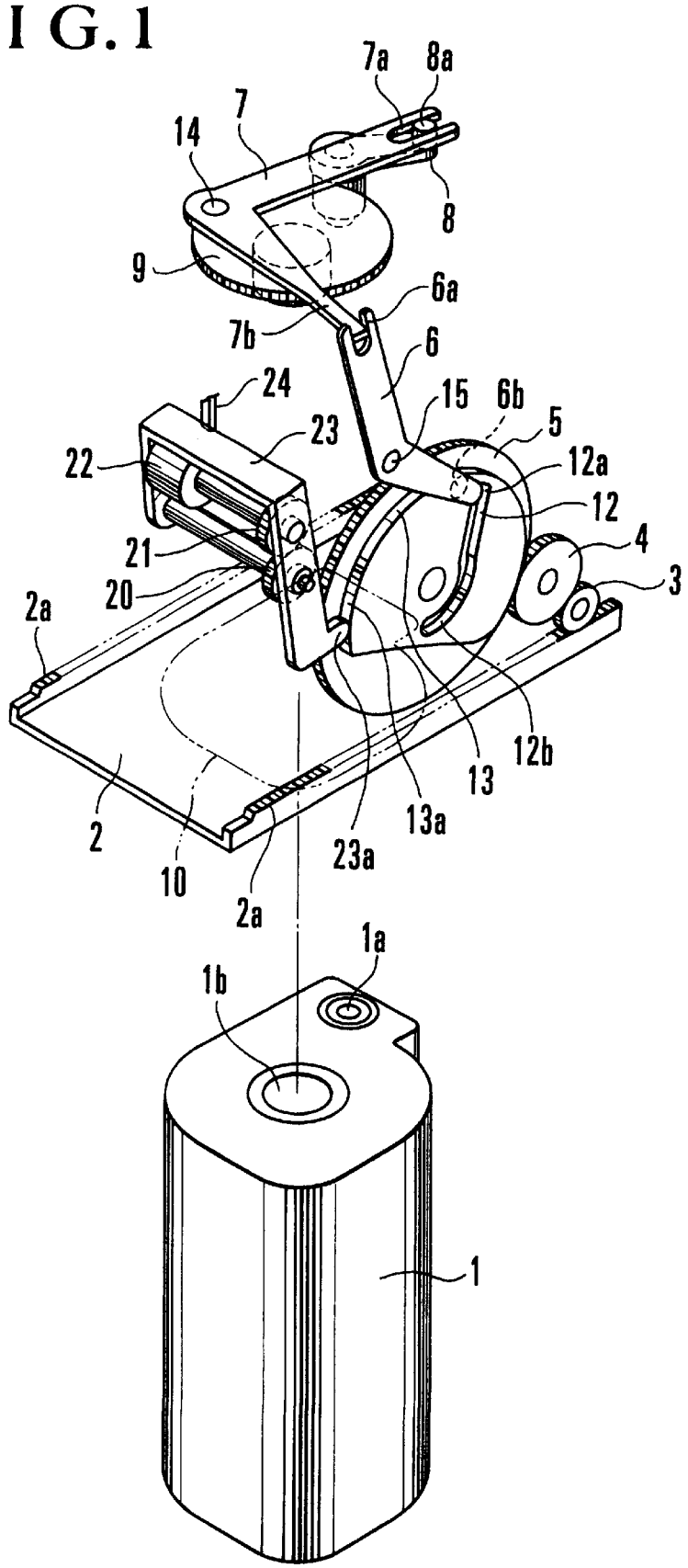
FIG. 1 is an oblique view showing a cartridge chamber of a first embodiment of this invention as in a state of having the lid of the cartridge chamber closed.
Figure 2:
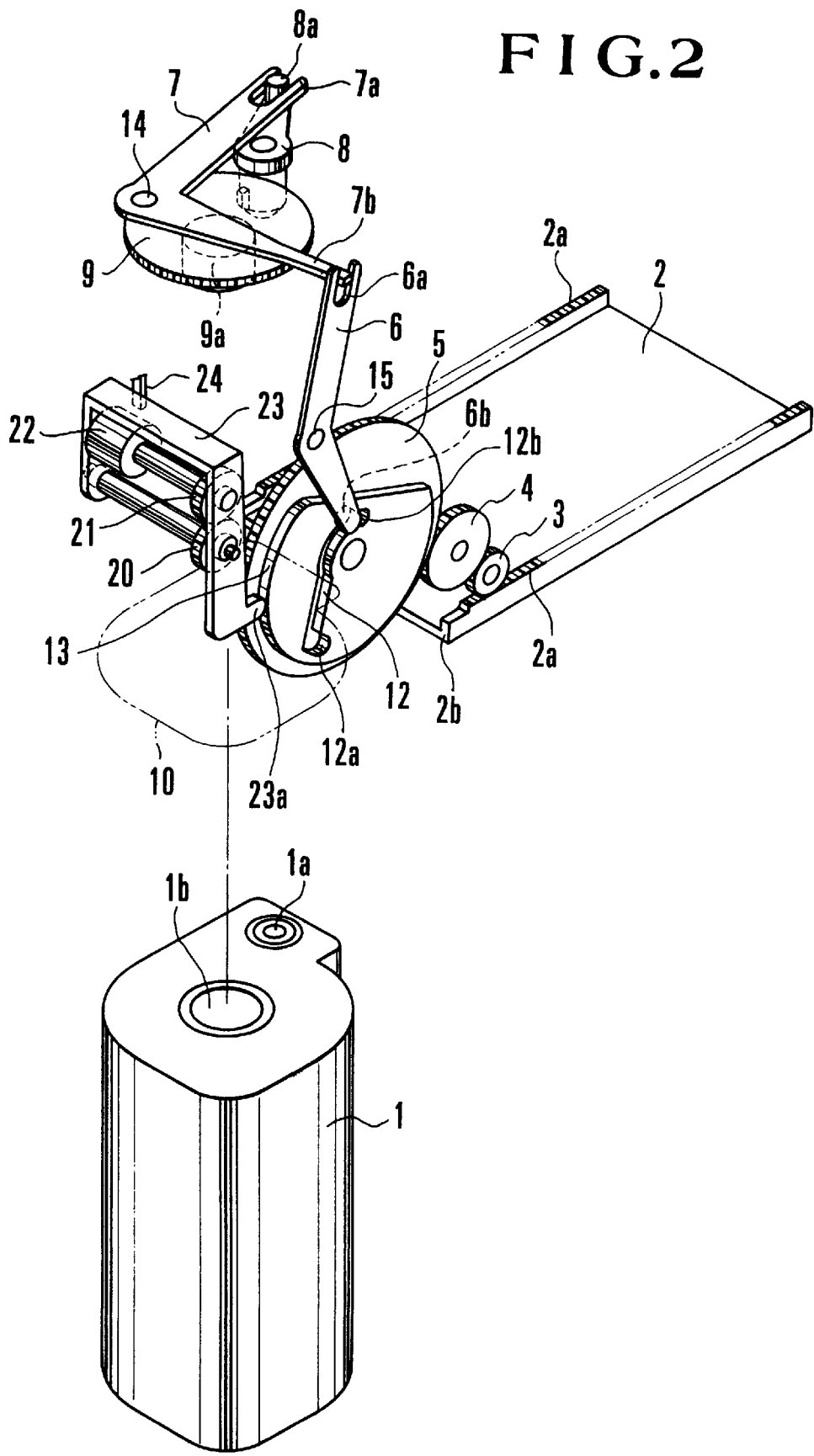
FIG. 2 is an oblique view showing the same embodiment as having the same lid in an open state.
Figure 3:
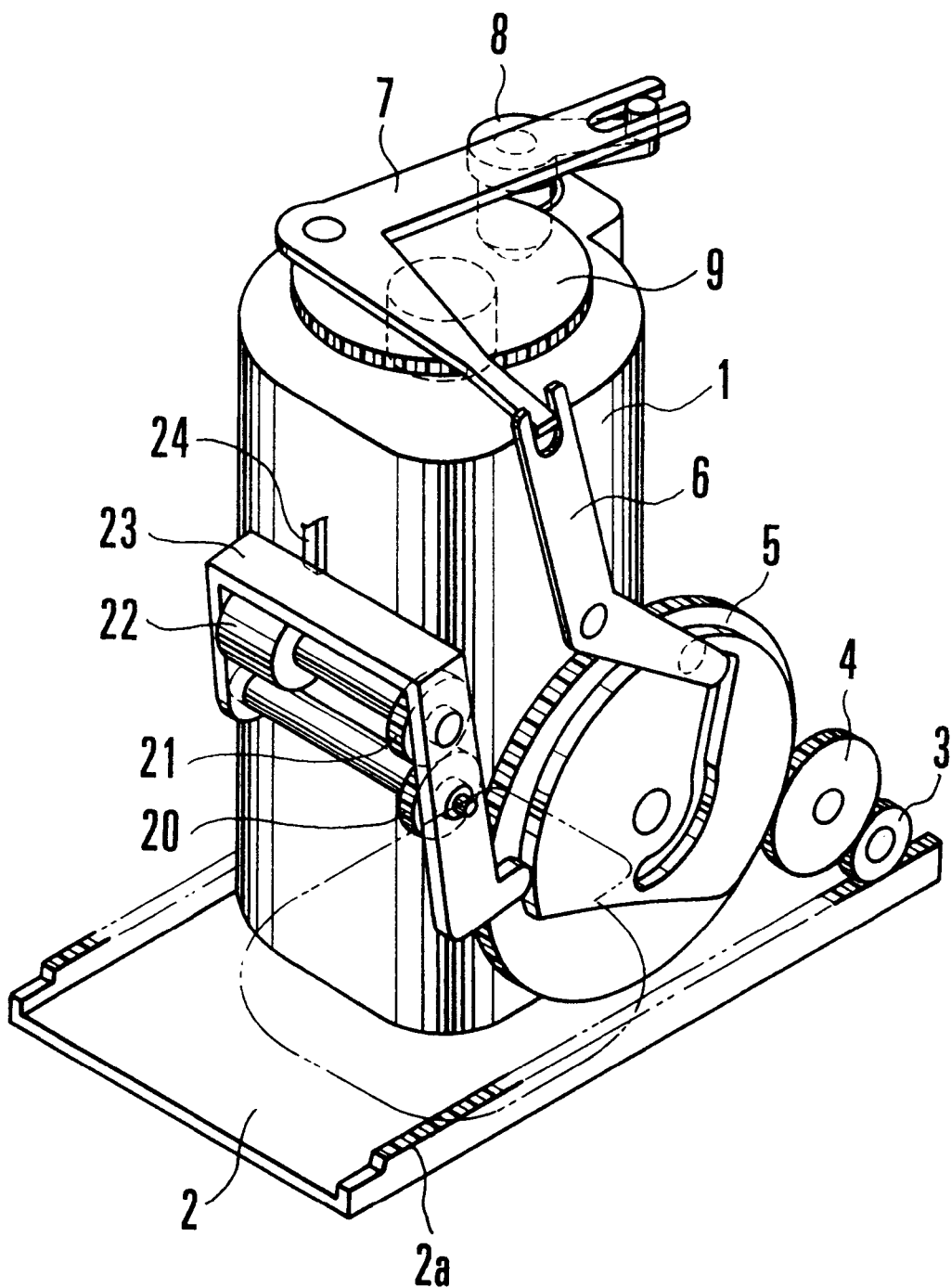
FIG. 3 is an oblique view showing a film cartridge as in a state of being loaded on the embodiment.
Figure 4:
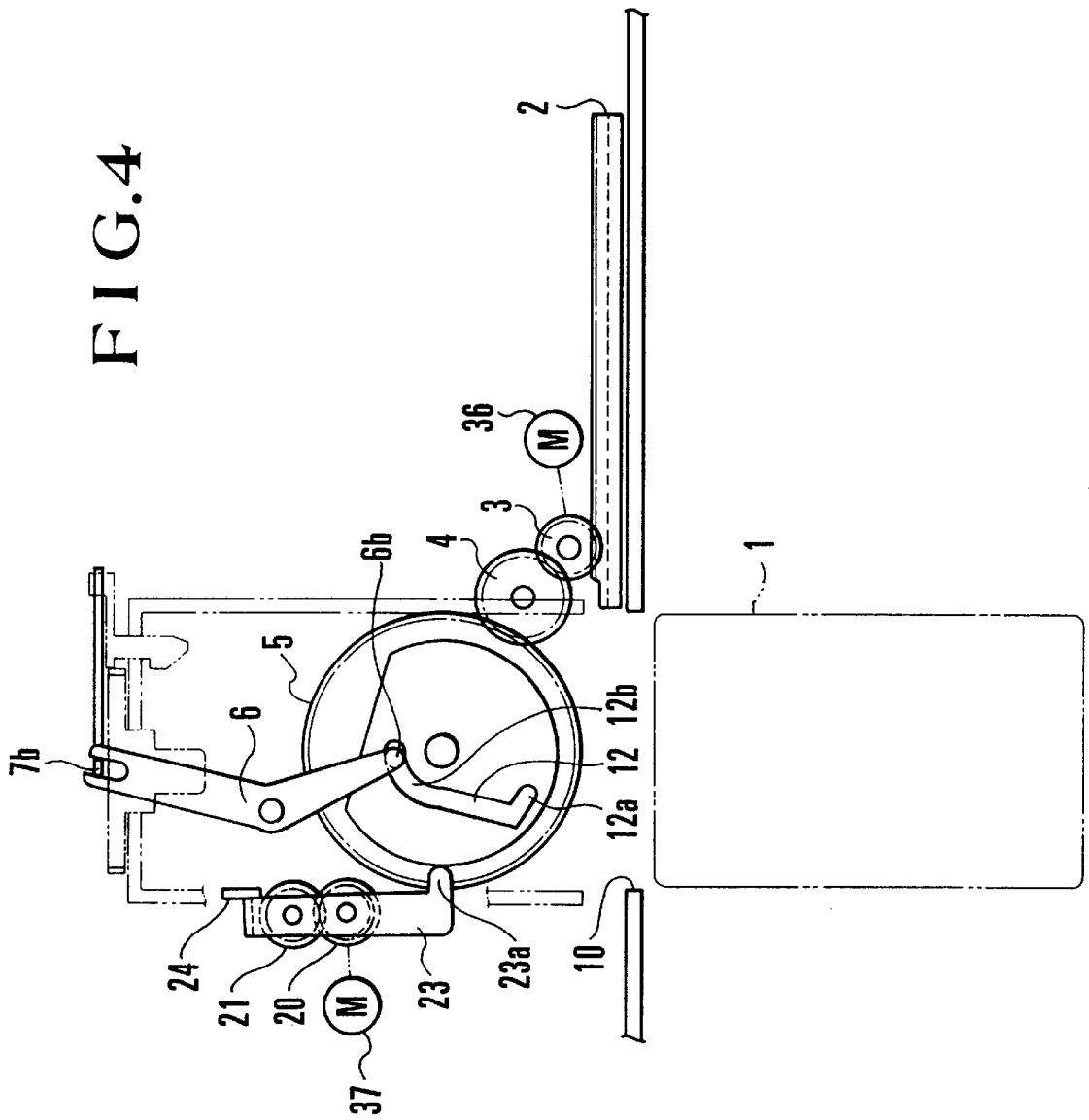
FIG. 4 is a plan view schematically showing the state of the first embodiment shown in FIG. 2.
Figure 5:
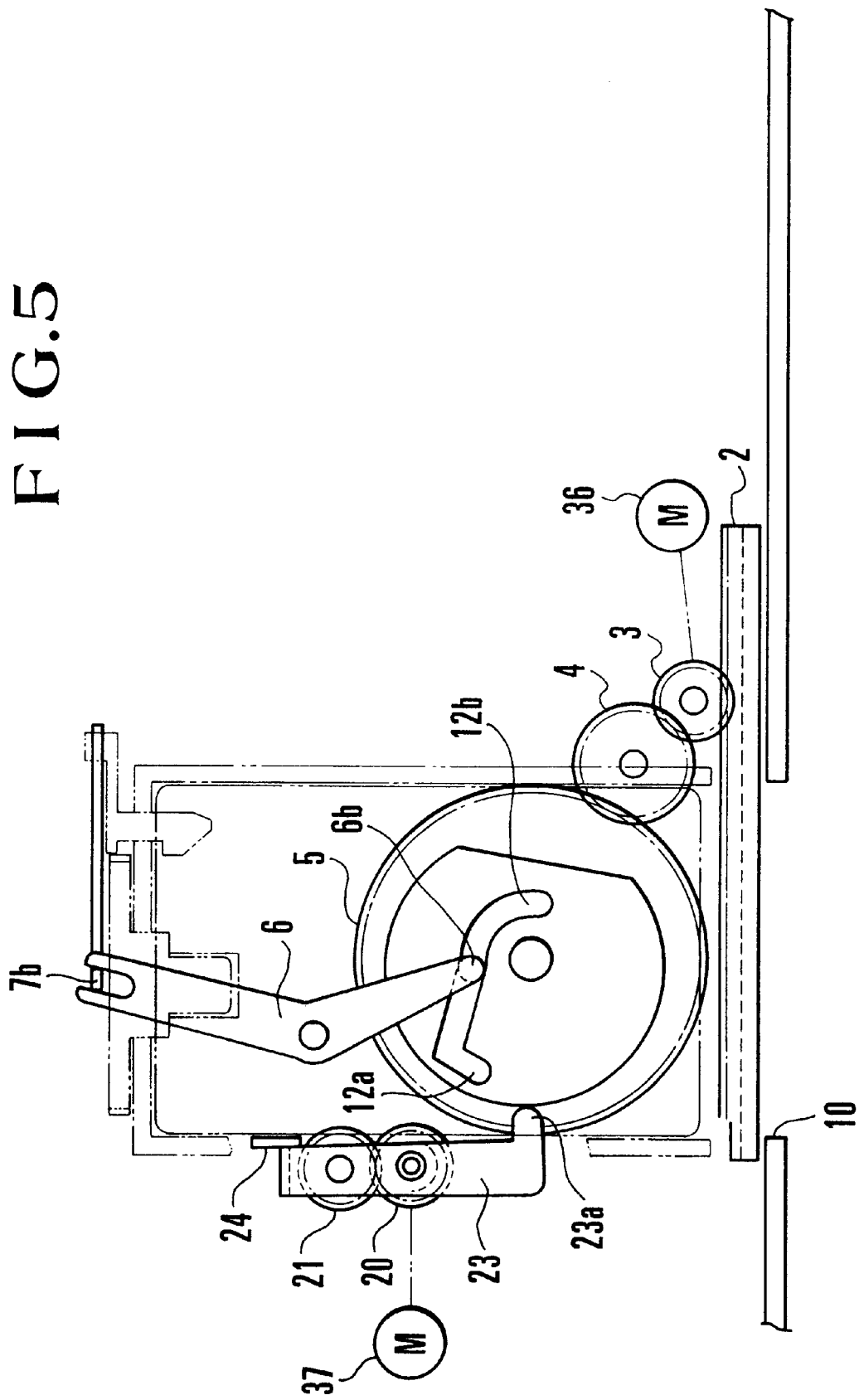
FIG. 5 is a plan view showing the lid of the cartridge chamber of FIG. 1 in the process of being-opened.
Figure 6:
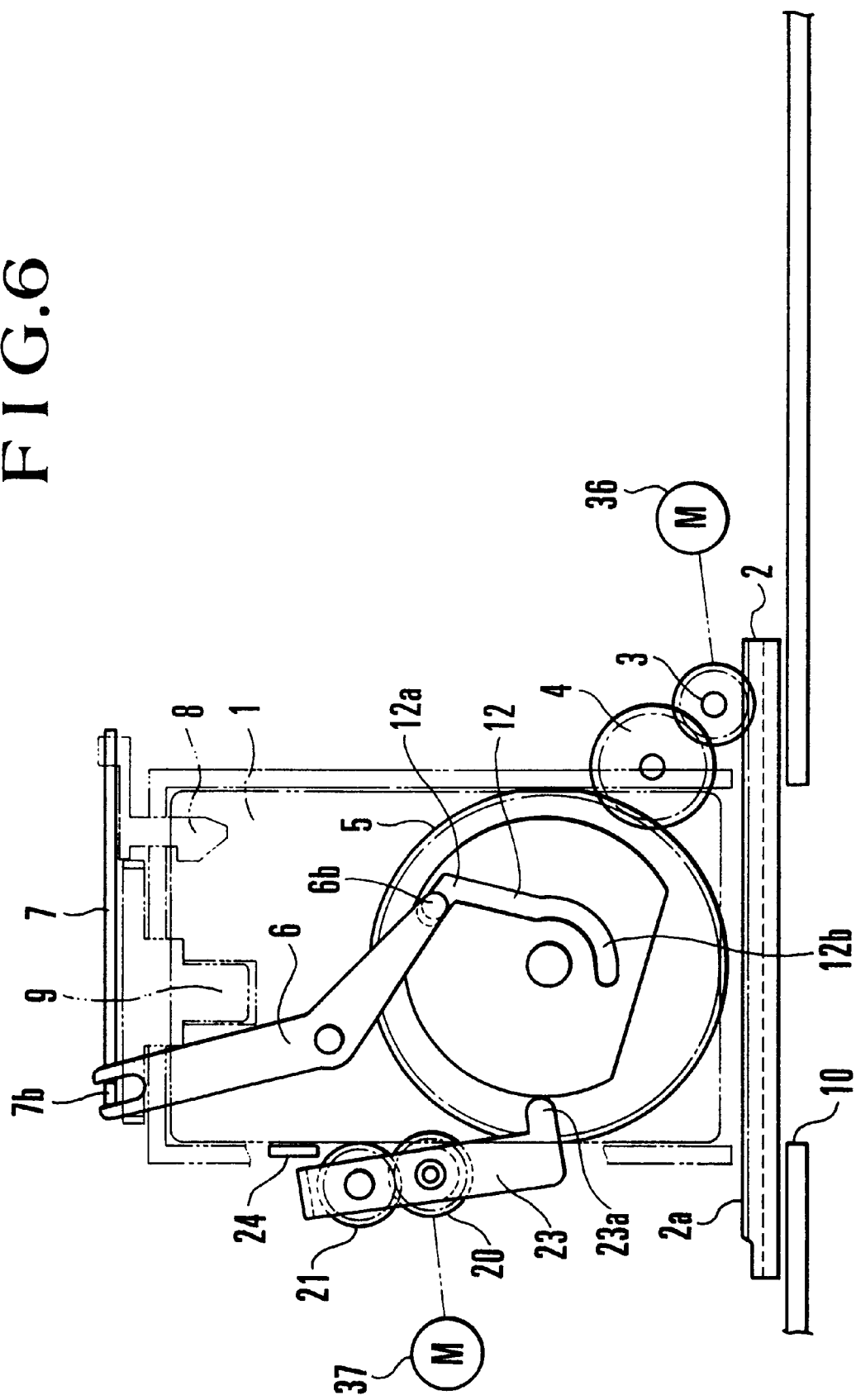
FIG. 6 is a plan view schematically showing the state of the first embodiment shown in FIG. 3.

FIGS. 1 to 3 are oblique views showing a film cartridge loading device of a camera arranged according to this invention as an embodiment thereof. FIGS. 4 to 6 schematically show the same device in plan views. In FIGS. 1 to 6, a part 10 indicated by a one-dot-chain line represents a film cartridge loading/unloading opening which is formed in the body of the camera. A film cartridge 1 which is formed as mentioned in the foregoing description of the related art is arranged to be axially inserted into a cartridge chamber through the film cartridge loading/unloading opening 10 from below the lower side of the camera body. A lid 2 of the cartridge chamber is formed in a U-like sectional shape and is arranged to be slidable right and left over the bottom surface of the camera body within a plane extending perpendicular to the axis of the film cartridge. Rack parts 2a are arranged on both sides of the lid 2. Driving gears 3 are gear coupled with a first motor 36 (see Fig. 4) and are disposed at both ends of a gear shaft in such a way as to be gear coupled with the rack parts 2a.

A light-blocking door opening/closing member 8 is arranged to be inserted into an inserting hole 1a of the film cartridge 1 and to be rotated in such a way as to open and close a light-blocking door which is provided for shielding from light a film inlet/outlet port formed in the film cartridge 1. An engaging pin 8a erected on the upper surface of the light-blocking door opening/closing member 8 engages a slot 7a formed in one end of a driving lever 7. The other end of the driving lever 7 is fitted into one end 6a of a transmission lever 6. A cam gear 5 is gear coupled with one of the driving gears 3 through an idler 4. The cam gear 5 is provided with a face cam part 13 and a cam groove 12. A cam pin 6b which is provided on the other end of the transmission lever 6 is fitted into the cam groove 12 of the cam gear 5.

A second motor 37 (see FIG. 4) is gear coupled with a sun gear 20. Both the sun gear 20 and a planet gear 21 which is arranged to be capable of revolving around the sun gear 20 are rotatably carried by a U-shaped planetary lever 23. The planetary lever 23 is rotatable on the gear shaft of the sun gear 20. A roller 22 which is made of a rubber material is inseparably attached to the shaft of the planet gear 21. A stopper 24 is provided on the camera body for restricting the rotation of the planetary lever 23 when the latter rotates clockwise. A fork gear 9 has a fork 9a which is arranged to play out (send out) and rewind a film by engaging the spool shaft 1b of the film cartridge 1.

The camera which is arranged as described above operates as described below.

FIG. 1 shows the camera as in a state in which it is not loaded with any film cartridge (an empty state) and the lid of the cartridge chamber is closed. In this state, the light-blocking door opening/closing member 8 is kept in a clockwise rotated position. In other words, if the film cartridge 1 is loaded, the light-blocking door which is provided at the film inlet/outlet port of the film cartridge 1 would be opened. The details of this action are as follows. With the lid 2 of the cartridge chamber completely closed in a position as shown in FIG. 1, the cam pin 6b of the transmission lever 6 engages a first cam part 12a of the cam groove 12 of the cam gear 5 and the transmission lever 6 has been caused to rotate counterclockwise. The light-blocking door opening/closing member 8 also has been caused to rotate clockwise. Under this condition, the planetary lever 23 is freely rotatable counterclockwise until the fore end 23b of the planetary lever 23 comes to abut on the first cam face 13a of the face cam part 13. Therefore, the roller 22 imposes no load on the external shell of the film cartridge 1.

With the camera in this state, when an opening/closing operation switch which will be described later is pushed for opening the lid 2 of the cartridge chamber, the first motor 36 turns on. The driving gears 3 are caused to rotate counterclockwise. The lid 2 of the cartridge chamber is, therefore, driven to slide to the right. The lid 2 comes to a stop in a position where it has been completely retracted to the right, away from the film cartridge loading/unloading opening 10, as shown in FIGS. 2 and 4.

Under this condition, the transmission lever 6 has been rotated clockwise with its cam pin 6 guided by the cam groove 12b. Therefore, the driving lever 7 has been rotated counterclockwise. If the film cartridge 1 is loaded with the light-blocking door opening/closing member 8 having been rotated counterclockwise, the film inlet/outlet port of the film cartridge 1 is kept in a state of having its light-blocking door closed.

Next, when the film cartridge 1 is axially inserted from below the camera body into the film cartridge loading/unloading opening 10, a switch which will be described later turns on. The film cartridge 1 is then pulled into the camera body by the pressing rotation force of the roller 22. More specifically, the second motor 37 causes, through the sun gear 20, the planet gear 21 to rotate counterclockwise to cause in turn the roller 22 to rotate counterclockwise. As a result, the elastic pressure of the roller 22 exerted perpendicular to the axis of the film cartridge 1 causes the film cartridge 1 to be pulled into the camera body. When the film cartridge 1 is completely pulled into the camera body, the second motor 37 turns off. The first motor 36 then turns on again to rotate in the direction reverse to the above-stated rotating direction to cause the cartridge chamber lid 2 to slide to the left. The light-blocking door opening/closing member must be kept in its position as shown in FIG. 2 before the fore end part of the cartridge chamber lid comes to completely cover the film cartridge loading/unloading opening. In other words, the light-blocking door of the film inlet/outlet port of the film cartridge 1 must be kept in a closed state. This state is kept by means of the second cam groove part 12b of the cam groove 12 which engages the cam pin 6b of the transmission lever 6 in a state as shown in FIG. 5.

When the sliding motion of the lid 2 of the cartridge chamber bring its fore end part 2b to a position where the film cartridge loading/unloading opening is completely covered by the lid 2, the cam pin 6b of the transmission lever 6 comes from the second cam groove part 12b to the first cam groove part 12a of the cam groove 12. The transmission lever 6 then swings counterclockwise to cause the driving lever 7 to swing clockwise. This in turn swings the light-blocking door opening/closing member 8 clockwise to open the light-blocking door of the film inlet/outlet port of the film cartridge 1. The planetary lever 23 which has been abutting on the face cam part 13 of the cam gear 5, on the other hand, becomes movable counterclockwise as much as an extent to which the face cam part 13 is moved away from it, because the face cam part 13 is retracted from its fore end part 23a. The roller 22 which has been pushing the external shell of the film cartridge 1 with the pressure of its rubber is freed from the film cartridge 1 and the pressure on the film cartridge 1 disappears. Therefore, the film cartridge 1 no longer has its position restricted upon completion of the film cartridge loading operation.

Therefore, a process of moving the film out from the film cartridge which is to be performed by a thrust driving action, after completion of the film cartridge loading operation, can be adequately carried out with a stable feeding torque as the roller 22 imposes no load on the spool shaft of the film cartridge 1.

After the above-stated sliding motion, the lid 2 of the cartridge chamber is caused by the first motor 36 to move to the left until it abuts on a stopper which is not shown. The first motor 36 is then turned off by the contact of the lid 2 with the stopper. The film cartridge loading operation comes to an end with the leftward movement of the cartridge chamber lid 2 coming to a stop. A state thus obtained is as shown in FIGS. 3 and 6.

A film cartridge unloading operation is carried out in a manner reverse to the above-state operation. The relation between the roller 22 and the film cartridge 1 is described in detail as follows.

Figure 7:
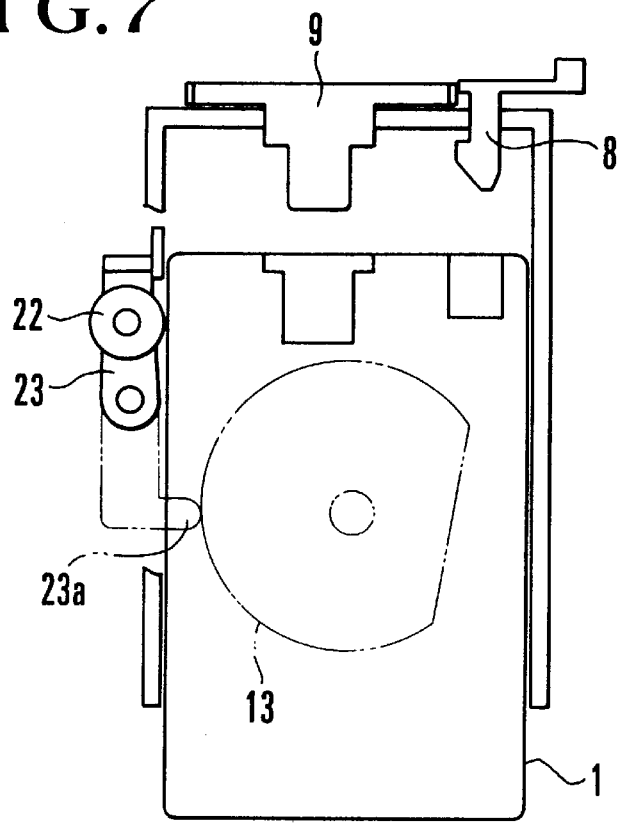
FIG. 7 is a sectional view of the cartridge chamber of FIG. 1 as in a state of having a roller pushed against a film cartridge.
Figure 8:
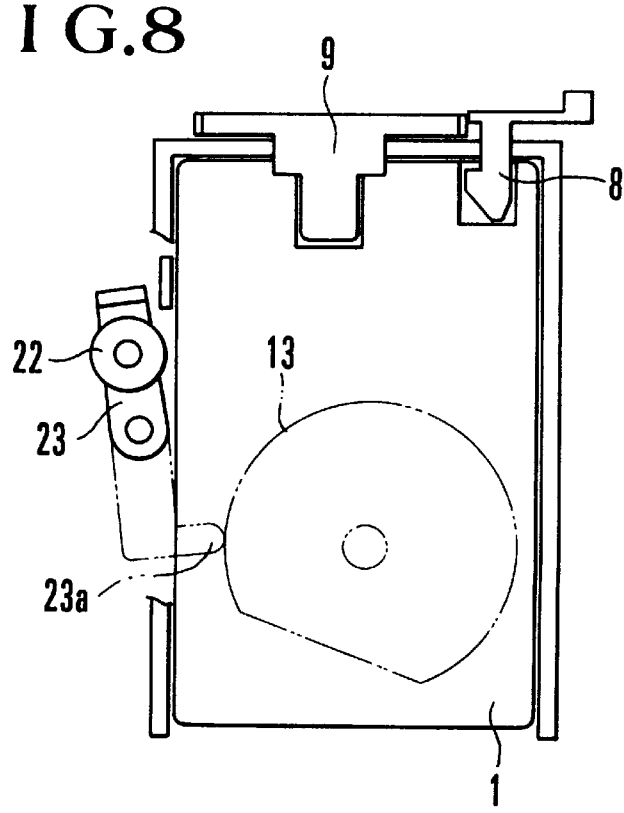
FIG. 8 shows the same roller as in a state in which the roller is retracted from the film cartridge.

FIGS. 7 and 8 are sectional views of the cartridge chamber. FIG. 7 shows the roller 22 either as in process of moving the film cartridge 1 into or out of the camera. Referring to FIG. 7, the fore end part 23a of the planetary lever 23 is in a state of being restricted from swinging counterclockwise by the face cam part 13. In this state, the outside of the roller 22 which is made of a rubber material slightly overlaps the shell surface of the film cartridge 1. The roller 22 thus imposes a pressing force on the shell of the film cartridge 1. The film cartridge is thus pulled inward or pushed outward according to the rotating direction of the roller 22.

FIG. 8 shows the roller 22 as in a state obtained after the film cartridge 1 has been completely pulled into the camera. In this state, the planetary lever 23 is movable counterclockwise until its fore end part 23a comes to abut on the face cam part 13. In the state of FIG. 8, therefore, the roller 22 can be moved away from the shell surface of the the film cartridge 1 by swinging the planetary lever 23 counterclockwise. The shell of the film cartridge 1 thus can be set free from the pushing force of the roller 22.

Figure 9:
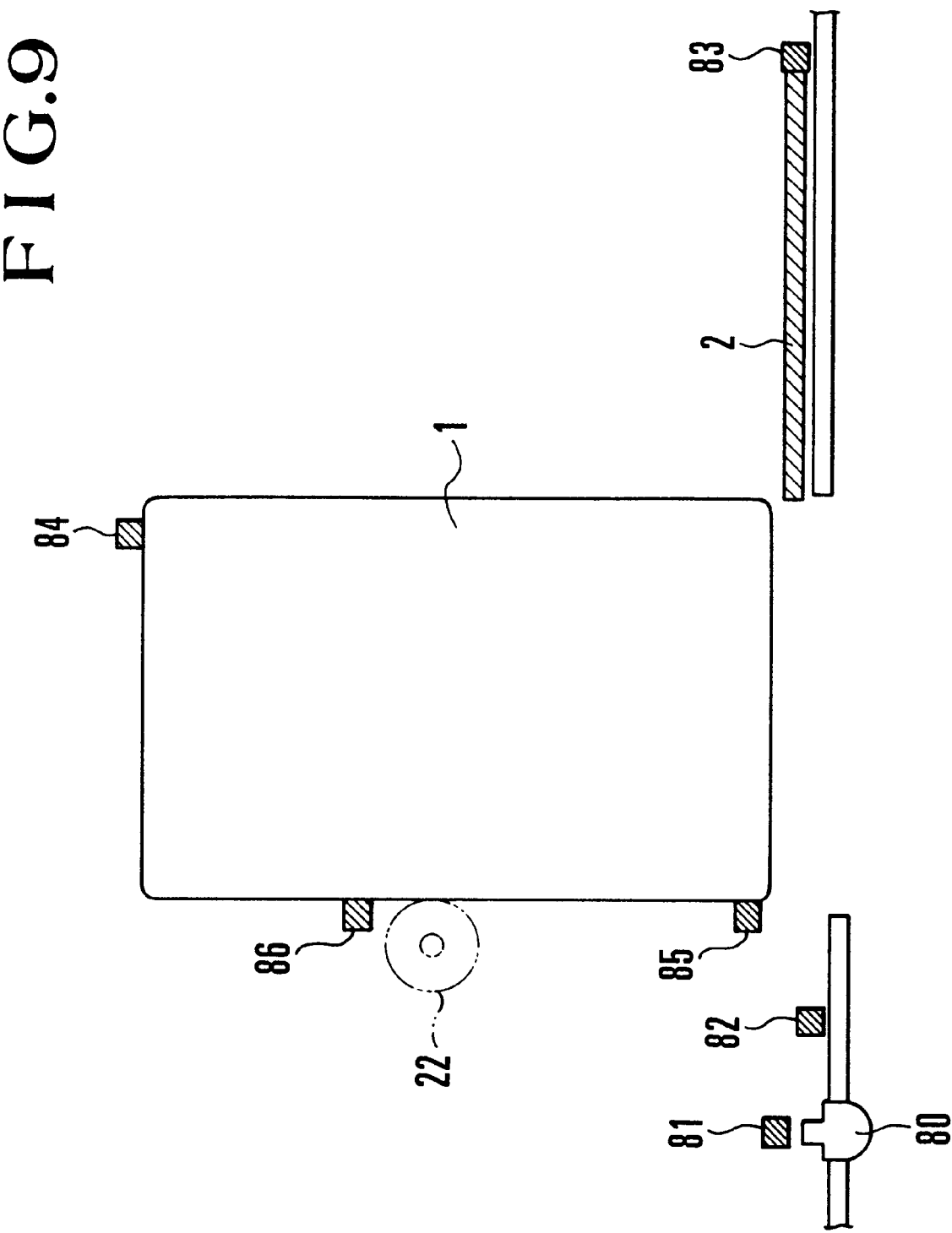
FIG. 9 shows a layout of switches which are arranged for the cartridge chamber of FIG. 1.

FIG. 9 shows switches arranged for control over the above-stated operation of the embodiment. Referring to FIG. 9, a lid opening/closing operation switch 81 is arranged to be turned on by pushing a lid opening/closing operation button 80 which is provided for opening and closing the lid 2 of the cartridge chamber. A lid-fully-closed-state detecting switch 82 is arranged to detect completion of the closing action of the lid 2 of the cartridge chamber. A lid-fully-open-state detecting switch 83 is arranged to detect completion of the opening action of the lid 2 of the cartridge chamber. A cartridge detecting switch 84 is arranged to detect that the film cartridge 1 is completely pulled into the camera. An insertion detecting switch 85 is arranged to detect that the film cartridge 1 is inserted into the camera through the film cartridge loading/unloading opening. A sending-out-completion switch 86 is arranged to detect completion of an action of moving the film cartridge 1 out from the cartridge chamber. Further, all these switches are arranged to be normally in an off-state.

Figure 10:
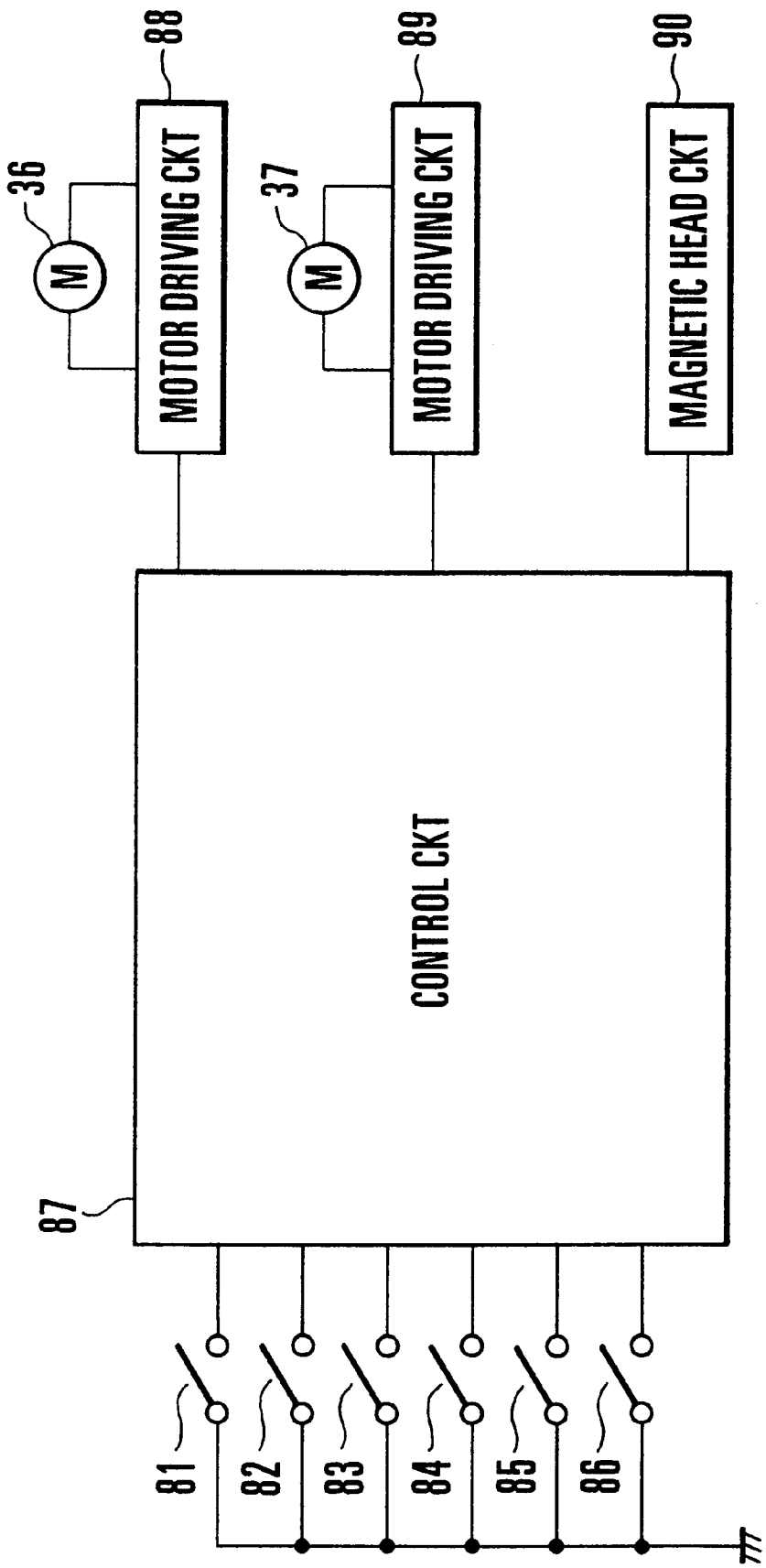
FIG. 10 is a block diagram showing the circuit arrangement of the first embodiment of this invention.

FIG. 10 is a block diagram showing the circuit arrangement for control over the actions mentioned above including those of the switches of FIG. 9. Referring to FIG. 10, a control circuit 87 includes among others a microcomputer which presides over the control mentioned above. Motor control circuits 88 and 89 are arranged to drive the motors 36 and 37 to make their normal or reverse rotations. A magnetic head circuit 90 is arranged to perform at least either magnetic recording or reading of information on or from the magnetic recording part which is provided on the film.

Figure 11:
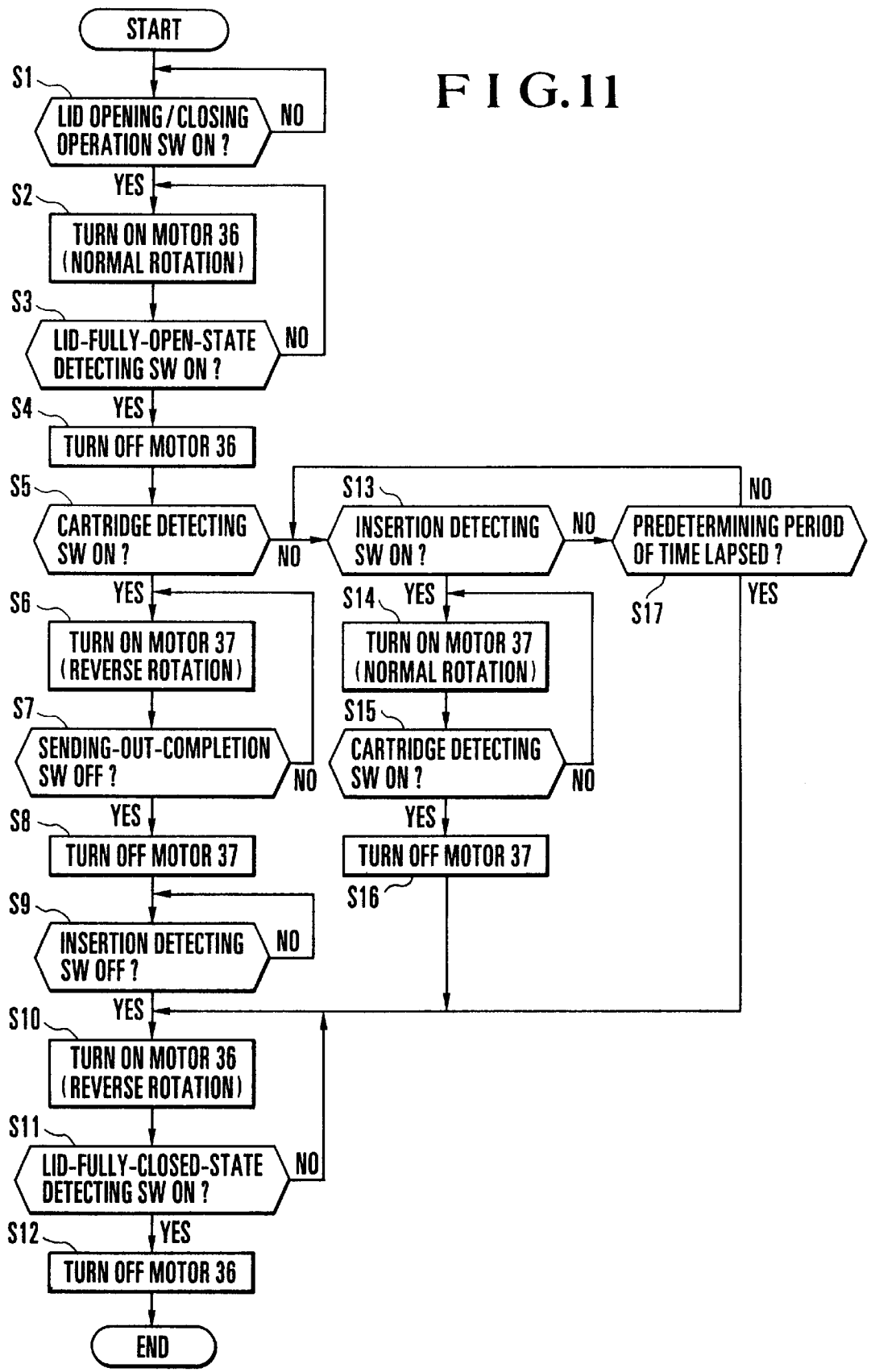
FIG. 11 is a flow chart showing the operation of a control circuit shown in FIG. 10.

The film cartridge pulling-in and sending-out operations of the circuit arrangement of FIG. 10 are next described with reference to FIG. 11 which is a flow chart.

The operation of pulling the film cartridge 1 into the cartridge chamber is first described. At a step S1, a check is made to find if the lid opening/closing switch 81 is turned on by a manual operation on the lid opening/closing button 81 which is provided for opening and closing the lid 2 of the cartridge chamber. If so, the flow of operation comes to a step S2. At the step S2, the motor driving circuit 88 turns on the motor 36 for a normal rotation. At a step S3, a check is made to find if the lid-fully-open-state detecting switch 83 turns on with the lid 2 of the cartridge chamber fully opened. If so, the flow comes to a step S4. At the step S4, the rotation of the motor 36 is brought to a stop. At a step S5, a check is made to find if the cartridge detecting switch 84 is in an on-state. If so, the flow comes to a step S6. However, since the switch 84 is in an off-state under the condition currently obtained, the flow comes to a step S13. At the step S13, a check is made to find if the insertion detecting switch 85 is in an on-state indicating that the film cartridge 1 is inserted from the cartridge loading/unloading opening. If so, the flow comes to a step S14. At the step S14, the motor driving circuit 89 turns on the motor 37 for a normal rotation. The roller 22 is driven to pull in the film cartridge 1. At a step S15, a check is made for the state of the cartridge detecting switch 84. If the switch 84 is found to be in an on-state thus indicating completion of the cartridge pulling-in operation, the flow comes to a step S16 to bring the rotation of the motor to a stop. The flow then comes to a step S10.

At the step S10, the motor 36 is caused to make a reverse rotation for closing the lid 2 of the cartridge chamber. At a step S11, a check is made to find if the lid-fully-closed-state detecting switch 82 is in an on-state. If so, the flow comes to a step S12 to bring the rotation of the motor 36 to a stop. The cartridge loading operation comes to an end. After that, a film feeding (or transporting) action is performed. During the process of the film feeding action, the magnetic head circuit 90 performs at least information recording or reading on or from the magnetic recording part of the film.

The operation of sending out the film cartridge 1 from the cartridge chamber is next described as follows.

In the case where the above-stated steps S1 to S5 of the flow of operation are executed while the camera is in a state of being loaded with the film cartridge, the flow comes to the step S6, as the cartridge detecting switch 84 is found to be in its on-state at the step S5 in this case. At the step S6, the motor 37 is caused to make a reverse rotation. At a step S7, a check is made to find if the sending-out-completion switch 86 is in its off-state thus indicating completion of the process of sending out the film cartridge. If so, the flow comes to a step S8. At the step S8, the rotation of the motor 37 is brought to a stop. Under this condition, the cartridge 1 remains in a state of being extracted only halfway from the cartridge loading/unloading opening. However, the insertion detecting switch 85 turns off when the cartridge 1 is taken out. At a step S9, a check is made to find if the insertion detecting switch 85 is in its off-state. If so, the flow comes to the step S10. At the step S10, the motor 36 is caused to make a reverse rotation for closing the lid 2 of the cartridge chamber. At the step S11, a check is made to find if the lid-fully-closed-state detecting switch 82 is in its on-state thus indicating completion of the action of closing the lid 2 of the cartridge chamber. If so, the flow comes to the step S12 to bring the rotation of the motor 36 to a stop.

Further, if the insertion detecting switch 85 is found to be not in its on-state at the step S13, the flow comes to a step S17 to make a check, through a timer disposed within the control circuit 87, to find if the film cartridge 1 is not inserted until the lapse of a predetermined period of time after the lid 2 of the cartridge chamber is opened. If so, the flow comes to the step S10 to have the cartridge chamber lid 2 closed again.

A second embodiment of this invention is next described. The first embodiment which is described above is arranged to retract the cartridge driving roller away from the shell surface of the film cartridge 1 by utilizing the planet gear. In the case of the second embodiment, however, the roller is provided with a flat surface part which is formed in a part of the roller. The roller is thus arranged to have this flat surface part opposed to the shell surface of the film cartridge in such a way as to detach the roller from the shell surface upon completion of loading the camera with the film cartridge.

Figure 12:
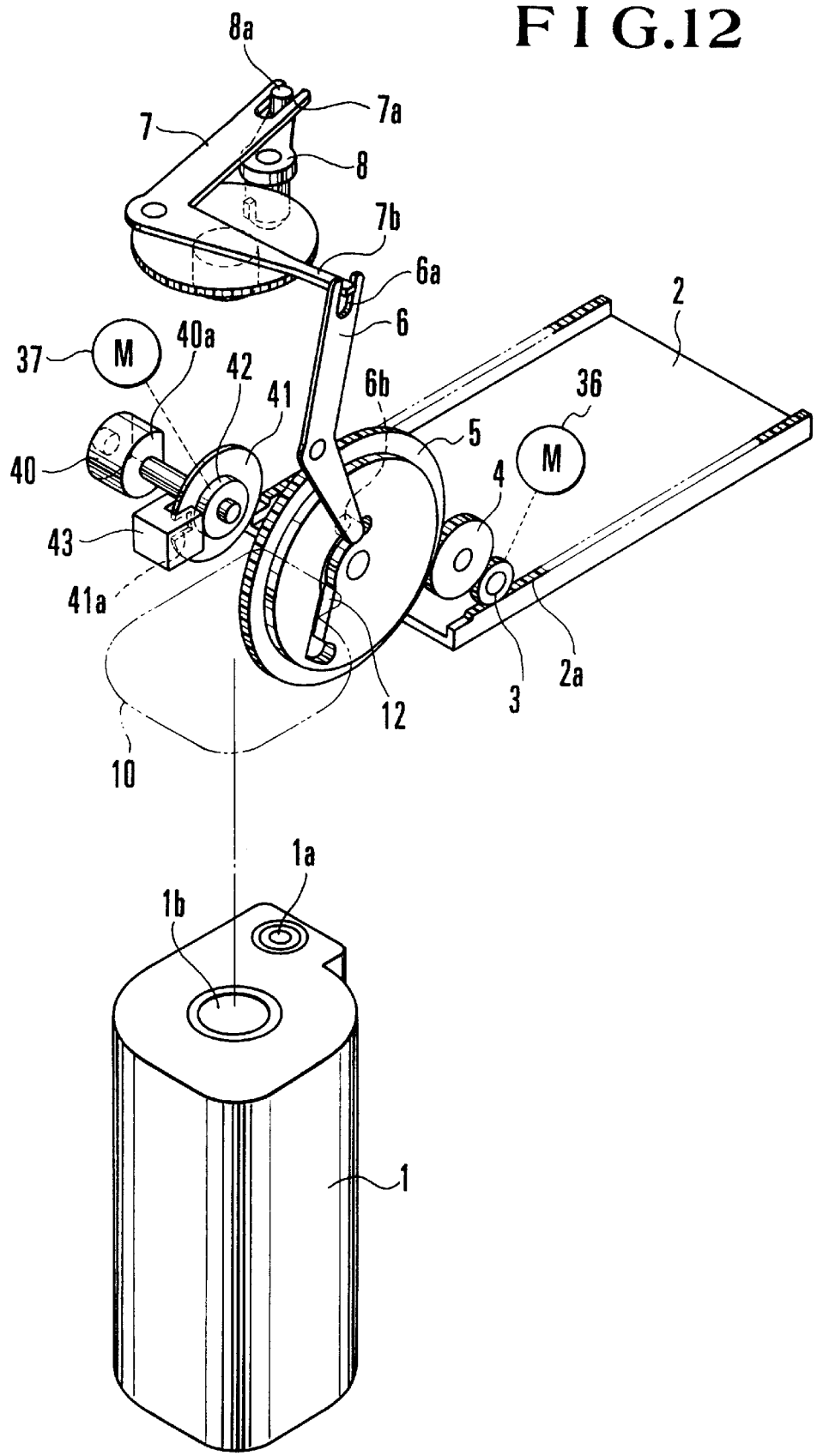
FIG. 12 is an oblique view showing a cartridge chamber of a second embodiment of this invention.
Figure 13:
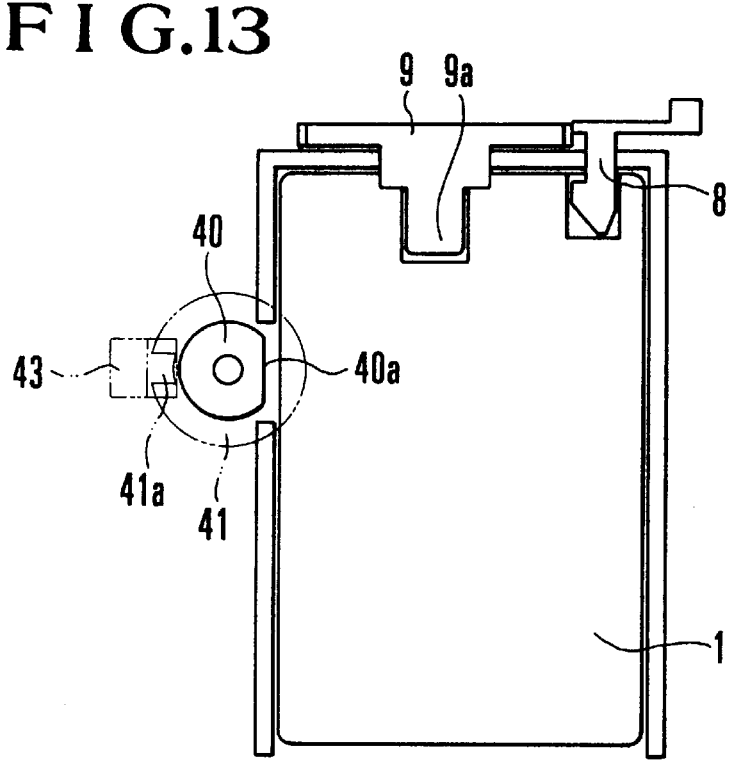
FIG. 13 is a vertical sectional view showing a roller of the cartridge chamber as in a state of having been retracted from a film cartridge.
Figure 14:
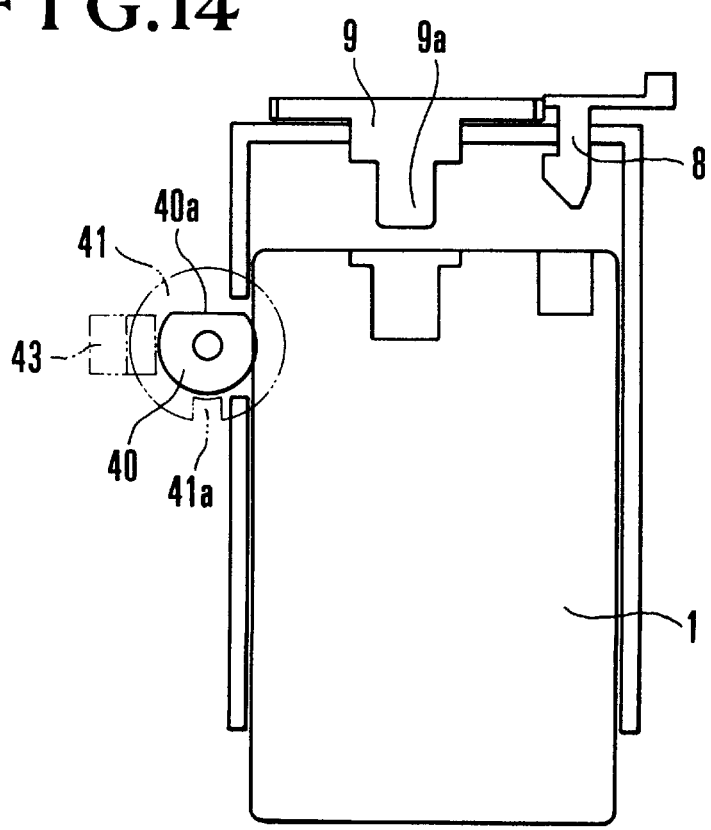
FIG. 14 is a vertical sectional view showing the roller as being pressed against the cartridge.

FIG. 12 shows in an oblique view the film cartridge loading device of the second embodiment. FIGS. 13 and 14 are vertical sectional views showing the same device. In these drawings, all parts arranged in the same manner as those of the first embodiment are indicated by the same reference numerals and the details of them are omitted from the following description, which covers only such parts that differ from the first embodiment.

Referring to FIG. 12, a roller driving gear 42 is gear coupled with the motor 37. A roller 40 which is provided with a flat surface part 40a is secured to the shaft of the roller driving gear 42. A cutout plate 41 which has a cutout part 41a is mounted on the roller driving gear 42 and arranged to rotate together with the roller driving gear 42.

A photo-interrupter 43 is provided for detecting the cutout part 41a of the cutout plate 41. The phase of the roller 40 is arranged such that its flat surface part 40a is opposed to the shell of the film cartridge 1 when the cutout plate 41 is kept in a position where its cutout part 41a is detected by the photo-interrupter 43. FIG. 13 shows this state and the position where the roller 40 is kept after the film cartridge 1 is completely pulled into the cartridge chamber. As apparent from FIG. 13, a clearance created between the roller 40 and the shell surface of the film cartridge 1 by the flat surface part 40a of the roller effectively prevents the film cartridge 1 from being pushed by the pressing force of the roller 40. Therefore, both a driving action of pushing (thrust) out the film cartridge 1 and a film transporting action can be stably carried out. FIG. 14 shows the film cartridge 1 as in a state of being driven halfway into or out of the cartridge chamber. The roller 40 is rotated to drive the film cartridge 1 intermittently with its circumferential part. More specifically, after the film cartridge 1 is inserted from the cartridge loading/unloading opening 10, the roller 40 is driven to rotate while its circumferential part is pushed against the shell surface of the cartridge 1. The cartridge 1 is then drawn (pulled) into the camera by a frictional force intermittently generated between the circumferential part of the roller 40 and the shell surface of the cartridge 1. When the cartridge 1 is completely drawn into the cartridge chamber, the cartridge detecting switch turns on in the same manner as in the case of the first embodiment. Then the motor 27 is deenergized to bring the roller 40 to a stop at a position where the cutout part 41a of the cutout plate 41 is detected by the photo-interrupter 43.

In each of the embodiments described, the film cartridge is drawn into or out of the camera by driving the roller with the motor. After completion of pulling the cartridge into the camera, the pressure of the roller on the shell of the film cartridge is canceled by retracting the roller away from the shell of the film cartridge. This arrangement effectively prevents any unnecessary external load other than the rotating force of the fork from being imposed on the spool shaft of the film cartridge, so that a stable thrust driving force can be obtained to ensure smooth film transportation in playing out or rewinding the film. The advantage of this arrangement is particularly great in a case where information is to be recorded or read out on or from the magnetic recording part of the film while the film is in motion.

Further, in the embodiment, the roller used for driving the film cartridge is arranged to be retracted upon completion of cartridge loading. However, the timing of retraction is not limited to this particular point of time but may be effected any other point of time as long as the roller is retracted when the film is in motion.

The roller which is employed as means for loading and unloading the film cartridge may be replaced with some other means, such as hooking means which is arranged to hook the film cartridge in loading and unloading it.

The method for preventing a load detrimental to feeding or transporting the film is not limited to the method of retracting the roller. The same purpose can be likewise attained by some other suitable method.

The driving force of the motor used as a drive source for loading and unloading the film cartridge of course may be replaced with the driving force of some other electric driving means, that of a spring, that of a manual operation or that of some other suitable means.

In each of the embodiments described, the lid of the cartridge chamber is arranged to be automatically closed if no cartridge is inserted upon the lapse of a predetermined period of time after the lid of the cartridge chamber is closed. That arrangement may be changed to replace the automatic closing action with some other action such as giving a warning or the like. It is also possible to control other actions such as the pulling in or moving-out action on the cartridge according to the lid opening or closing action instead of controlling the lid opening and closing actions.

In accordance with this invention, the film cartridge does not have to be inserted from below the lower part of the camera. The camera may be arranged to have the film cartridge inserted either from above or from one side of it instead of inserting it from below.

Further, in accordance with this invention, the film cartridge does not have to be inserted in its axial direction as in the cases of the embodiments described.

This invention is applicable also to such a camera that is arranged to use a cartridge having a movable light-blocking door or the like of a shape which differs from the shape described in the foregoing.

This invention is applicable also to an image recording medium other than a film.

This invention is applicable also to a cartridge of a type which differs from the type of the cartridge to be used by the embodiments described, or to a cartridge containing an image recording medium other than a film, to a different kind of a cartridge or even to some other loading matter other than a cartridge such as a battery.

Further, this invention applies also to an apparatus of the kind arranged to perform information recording or reading on or from a film in a manner other than electronic, optical and magnetic manners.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded with broadest interpretation so as to encompass all such modifications and equivalent structures and functions.

Further the individual components shown in schematic or block form in the drawings are all well-known in the camera arts and their specific construction and operation are not critical to the operation or best mode for carrying out the invention.

Further the invention can be practiced by arranging the embodiments or their technological elements in combination as desired.

Further the invention applies also to an apparatus which consists of the components of the embodiments described either in their entirety or in part. The embodiments may be combined with some other apparatus or may be employed as a component of an apparatus.

Further the invention is applicable to cameras of varied kinds such as a single-lens reflex camera, a lens-shutter type camera and a video camera, to an optical apparatus or some other apparatus other than a camera and to a device or an element that is employed as a component of a camera, an optical apparatus or some other apparatus.

What is claimed is:

1. An apparatus adapted to a film cartridge, comprising:
   a) a first device engageable with the film cartridge, which moves the film cartridge by engagement with the film cartridge at least for one of loading and unloading the cartridge with respect to the apparatus;
   b) a second device which transports a film contained in the film cartridge; and
   c) a third device which disengages said first device from engagement with the film cartridge when said second device operates.

2. An apparatus according to claim 1, wherein said first device includes a motor.

3. An apparatus according to claim 1, wherein said first device includes a roller which is arranged to be pressed against the film cartridge.

4. An apparatus according to claim 3, wherein said third device includes means for canceling the pressed contact of said roller with the film cartridge.

5. An apparatus according to claim 3, wherein said second device includes means for opposing to the film cartridge a non-contact part of said roller at which said roller comes into non-contact with the film cartridge.

6. An apparatus according to claim 1, wherein said third device includes means for canceling the action of said first device on the film cartridge.

7. An apparatus according to claim 1, further comprising a fourth device which controls said third device relative to at least one of the loading and the unloading of the film cartridge.

8. An apparatus according to claim 7, wherein said film cartridge includes a movable cover, said fourth device including a device which moves the film cartridge cover.

9. An apparatus according to claim 7, wherein said camera includes a cartridge loading chamber and a movable cover for said cartridge loading chamber, said fourth device including a device which moves said cover.

10. An apparatus according to claim 9, further comprising means for automatically closing the cover of said cartridge loading chamber upon a lapse of a predetermined period of time after the cover of said cartridge loading chamber is opened by said fourth device.

11. An apparatus according to claim 1, further comprising means for controlling said third device relative to actuating a cover of the film cartridge.

12. An apparatus according to claim 1, wherein said third device includes a device which moves said first device.

13. An apparatus according to claim 1, wherein said third device includes a cam for moving said first device.

14. An apparatus according to claim 1, wherein said third device includes a position detector for moving said first device.

15. An apparatus according to claim 1, further comprising means for at least one of recording information on and reading information from an information recording portion of the film being supplied from the film cartridge while the film is in process of being transported.

16. An apparatus according to claim 1, wherein said apparatus comprises a camera.

17. An apparatus adapted to a film cartridge, comprising:
   a) a cartridge chamber to be charged with the film cartridge,
   b) a cover for opening and closing the film cartridge chamber,
   c) a warning means for performing a predetermined warning operation, and
   d) a control means for judging whether or not a condition that the cover of the cartridge chamber is in an open state and the film cartridge is not charged in the film cartridge chamber has continued for a predetermined time, and, if affirmative, causing the warning means to perform the predetermined warning operation.

18. An apparatus according to claim 17, wherein said apparatus includes a cartridge loading chamber and a movable cover for said cartridge loading chamber, said first device including a device which opens a cover of a cartridge loading chamber.

19. An apparatus according to claim 18, wherein said first device includes a motor.

20. An apparatus according to claim 19, wherein said second device includes means for closing said cartridge loading chamber cover.

21. An apparatus according to claim 18, wherein said second device includes means for closing said cartridge loading chamber cover.

22. An apparatus according to claim 17, wherein said first device includes a motor.

23. An apparatus according to claim 17, wherein said apparatus comprises a camera.

24. Apparatus adapted to a film cartridge, comprising:
   a) a cartridge chamber to be charged with the film cartridge,
   b) a cover for opening and closing said film cartridge chamber,
   c) driving means for driving the cover of the film cartridge chamber to shift from an opening state to a closing state, and
   d) control means for judging whether or not a condition that the cover of the cartridge chamber is in open state and the film cartridge is not charged in the film cartridge chamber has continued for a predetermined time, and if affirmative, causing the drive means to drive the cover of the cartridge chamber to close.

25. Apparatus according to claim 24, wherein said controller closes said cover without waiting for the predetermined time period if the film cartridge is loaded into said cartridge chamber.

26. Apparatus according to claim 24, wherein said apparatus comprises a camera.

27. A camera adapted to a film cartridge comprising:
   a) a cartridge chamber to be charged with the film cartridge, b) a cover for opening and closing the film cartridge chamber, c) a warning means for performing a predetermined warning operation, and d) a control means for judging whether or not a condition that the cover of the cartridge chamber is in an open state and the film cartridge is not charged in the film cartridge chamber has continued for a predetermined time, and, if affirmative, causing the warning means to perform the predetermined warning operation.

28. A camera adapted to a film cartridge comprising:

a) a cartridge chamber to be charged with the film cartridge, b) a cover for opening and closing said film cartridge chamber, c) driving means for driving the cover of the film cartridge chamber to shift from an opening state to a closing state, and d) control means for judging whether or not a condition that the cover of the cartridge chamber is in open state and the film cartridge is not charged in the film cartridge chamber has continued for a predetermined time, and if affirmative, causing the drive means to drive the cover of the cartridge chamber to close.

* * * * *

UNITED STATES PATENT AND TRADEMARK OFFICE
CERTIFICATE OF CORRECTION

PATENT NO. : 6,137,961  
DATED : October 24, 2000  
INVENTOR(S) : Yukio Ogawa

It is certified that error appears in the above-identified patent and that said Letters Patent is hereby corrected as shown below:

Column 2,  
Line 38, delete "being-opened" and insert -- being opened --.

Column 10,  
Line 14, delete "to be charged with" and insert -- into which is to be inserted --.  
Line 23, delete "charged" and insert -- inserted --.  
Line 45, delete "to be charged with" and insert -- into which is to be inserted --.  
Line 55, delete "charged" and insert -- inserted --.  
Line 67, delete "to be charged with" and insert -- into which is to be inserted --.

Column 11,  
Line 7, delete "charged" and insert -- inserted --.  
Line 12, delete "to be charged with" and insert -- into which is to be inserted --.

Column 12,  
Line 8, delete "charged" and insert -- inserted --.

Signed and Sealed this

Eighteenth Day of December, 2001

*Attest:*

*Attesting Officer*

JAMES E. ROGAN  
*Director of the United States Patent and Trademark Office*